H. B. HOLTVOIGT.
SIDE DELIVERY RAKE.
APPLICATION FILED MAY 6, 1914.
1,240,451.
Patented Sept. 18, 1917.
2 SHEETS—SHEET 1.
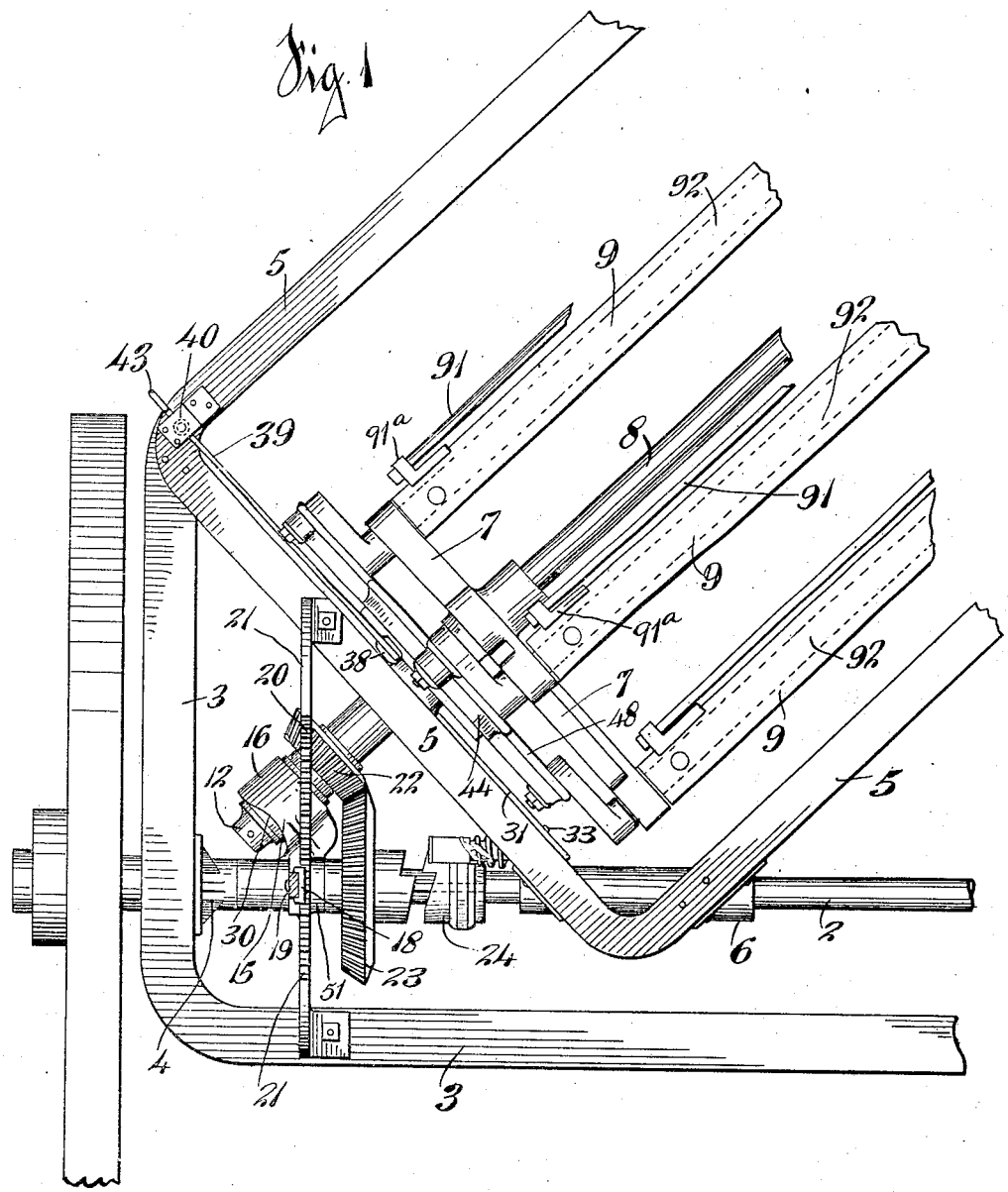

H. B. HOLTVOIGT.
SIDE DELIVERY RAKE.
APPLICATION FILED MAY 6, 1914.
1,240,451.
Patented Sept. 18, 1917.
2 SHEETS—SHEET 2.
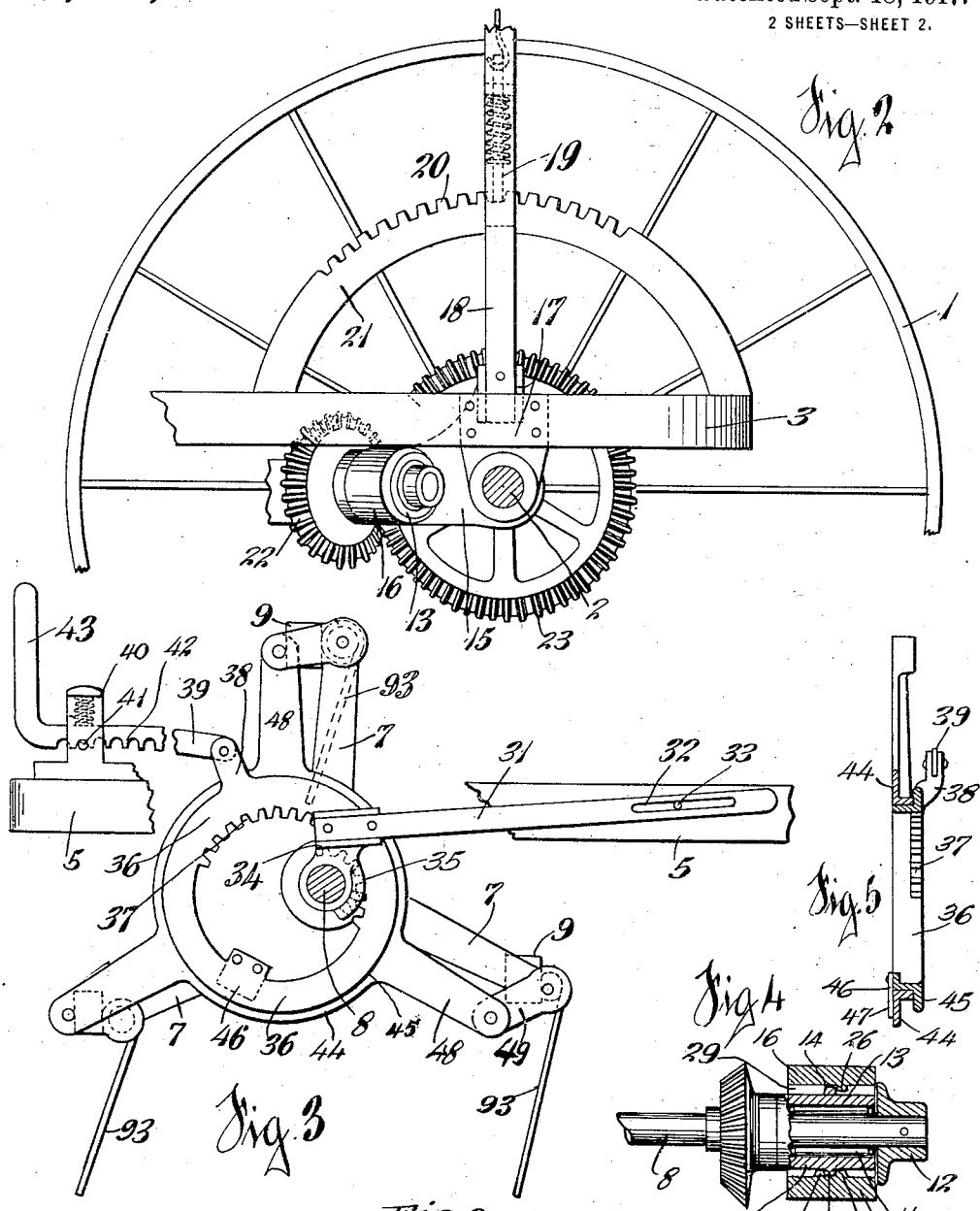
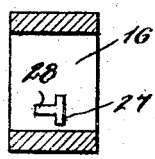

UNITED STATES PATENT OFFICE.

HENRY B. HOLTVOIGT, OF DAYTON, OHIO, ASSIGNOR TO THE OHIO RAKE COMPANY, OF DAYTON, OHIO, A CORPORATION OF OHIO.

SIDE-DELIVERY RAKE.

1,240,451.  Specification of Letters Patent.  Patented Sept. 18, 1917.

Application filed May 6, 1914. Serial No. 836,604.

*To all whom it may concern:*

Be it known that I, HENRY B. HOLTVOIGT, a citizen of the United States, and a resident of the city of Dayton, in the county of Montgomery and State of Ohio, have invented certain new and useful Improvements in Side-Delivery Rakes, of which the following is a full, clear, and exact description, reference being had to the accompanying drawings, forming part of this specification.

My invention has relation to side delivery rakes wherein the rake teeth bars are pivoted in a revolving reel, and eccentric means is employed to keep the rake teeth in a constant angle to the reel shaft or axle. In eccentric devices for this purpose, particularly in agricultural implements, it has been customary to mount the eccentric disk loosely on the shaft, and hold it in fixed position on the frame of the rake by an adjustable rod.

It is the principal object of my invention to mount the eccentric upon an immovable bearing which is supported by the frame. The altering of its position toward the shaft has nothing to do with the shaft itself, and the revolving shaft has no frictional pull on the eccentric of any kind. I also desire to improve the means for mounting the rake reel shaft so that it can be easily raised and lowered by tilting it in its hanger. These objects I accomplish, together with other advantages, by that certain construction and arrangement of parts to be more specifically pointed out and claimed.

In the drawings,

Figure 1 is a top plan view of the transmission side of my side delivery rake.

Fig. 2 is a side elevation, showing the driving gears and rake shaft adjusting means, with other parts removed the section being taken just inside of the right carrying wheel.

Fig. 3 is a side elevation, showing the eccentric mounting and adjusting means, with other parts removed.

Fig. 4 is a detail, in section, of the shaft supporting means.

Fig. 5 is a central vertical section of the eccentric strap and internal gear.

Fig. 6 is a detail section of the hanger journal taken at an angle to show the T-shaped lug on the inner periphery thereof.

It is the familiar practice in side delivery rakes of the type herein, to provide a means for mounting a reel on a diagonally extending shaft, to provide an eccentric device with arms that extend out to the ends of the reel, and to provide pivotal connection between the arms on the eccentric and each of the rake bars. The rake bars are customarily rotatably mounted on the laterally extending portions of the reel, and when the reel is rotated the result is that the rake bars are continually moved by the eccentric connection which they are provided with to bring the rake teeth on the bars into a proper relation with the ground so as to give a clawing motion to the matter to be raked.

In my invention, any desired form of rake mounting can be employed and my invention has relation to certain details of construction and adjustment which is all that is believed necessary to specifically describe.

The rake has carrying wheels 1 and a main axle 2 on which is mounted, as customary, the frame work 3, having a large journal 4 through which the axle passes. The side delivery or diagonal frame 5 is secured at its forward end to the frame 3 in the usual manner and has a sleeve bearing 6 for the axle 2.

The reels, one at each end of the raking device and having reel arms 7, are fixedly mounted on the shaft 8 in any desired manner, said shaft 8 being supported as will be described at its forward end, extending across beneath the frame 5 and provided with any desired mounting at the rear end of the diagonal frame, said mounting being in a slotted bearing to permit the shaft to be tipped up in it, as will be described.

The rake bars 92 which have mounted fixedly on them the rake teeth 93, in the usual manner, have suitably secured to them the supporting lateral members 9, and extend through and are journaled in the ends of the reel arms 7. These supporting members have strut reinforcing rods 91, which are mounted thereon by means of brackets 91ª, and may be provided with turn buckles (not shown) for purposes of taking them up should it be necessary. If the strut rods are not used, there is found to be a sagging in the middle of the rake bars and the supporting members which seriously interferes with the proper working of the machine.

To mount the shaft 8 at the transmission end, a roller bearing 11 (Fig. 4) is held on the end of the shaft by a cap 12. On this roller bearing and likewise held by the cap 12 is a sleeve 13, having a central peripheral rib 14.

It has been found that to raise one end of the rake shaft 8 is sufficient to remove the rake teeth from contact with the ground, and accordingly this is all that is done here. In so doing, however, it is necessary to provide a hanger which will allow the shaft to rest diagonally as well as horizontally therein, and therefore I provide the hanger 15 having a journal 16, to loosely support the sleeve 13 above mentioned.

This journal 16 has an interior lug 26 which bears against the rib 14, and a T-shaped lug, with the top part 27 of the T bearing against the rib, and the other part 28 passing through a cut-away portion of the rib 14 (not shown). This part 28 prevents the sleeve 13 from rotating in the journal 16 and throws all the revolution of the shaft on the roller bearings 11.

Since the space 29 is left between the journal and the sleeve, it can be seen that if the journal is raised, thereby tipping up the shaft, that the sleeve may readily assume a diagonal position in the journal. To accommodate it in this latter position, the end of the journal 16 is cut away at 30, so that there is nothing to interfere with the edge of the sleeve when slanted in the journal as described.

The other end 51 of the hanger 15 is journaled on the axle 2 of the machine. A vertical socket 17 in the hanger receives a lever arm 18. A spring pawl 19 on the upper end of this arm seats in the notches 20 of a large quadrant 21, secured to the frames 3 and 5. As the hanger 15 is mounted on the shaft 2 which carries the gear 23, and the gear 22 is mounted on the shaft 8 supported in the bearing 16 of the hanger, as the hanger is rocked by the hand lever 18 to raise and lower the shaft 8, the gears 22 and 23 will always remain in mesh.

To adjust the position of the shaft, the pawl is pulled up, the lever swung and the journal bearing 11 raised, thereby raising the shaft and with it the reels 7.

To drive the shaft 8, a beveled gear 22 is mounted on the shaft, to mesh with a beveled gear 23 loosely mounted on the axle 2. A clutch member 24 mounted to slide but not rotate on the axle is employed to impart motion to the gear 23, and thence to the shaft 8 in the ordinary manner.

It is believed that the operation of the rake reels is now clear, without further remark, and it remains to describe the eccentric means for maintaining the rake teeth in a constant vertical position.

Mounted loosely on the rake shaft 8 is a segment gear 35 the hub of which has an arm 34 integral therewith by which the gear is secured to the bar 31. The bar 31 is connected to the frame 5, through the pin and slot connection 32, 33, whereby the shaft 8 may be raised and lowered without breaking the connection. An eccentric 36 with internal gear teeth 37, meshes with the gear 35. An arm 38 on the eccentric is pivotally connected with a lever arm 39. This adjusting lever 39 passes under a stud 40 on the frame 5, within which it is spring-pressed against a horizontal pin 41. The lever has a rack 42 to engage the pin and a handle 43. To alter the position of the eccentric, the lever is raised, released from the pin and pushed in or pulled out as desired, thereby rotating the gear 37 on the segment gear 35.

The eccentric strap 44 is rotatably mounted on the eccentric 36. This is accomplished by providing a flange 45 on the eccentric, and securing to the eccentric a holding plate 46, which extends at 47 over the outside of the eccentric strap. Thus the flange 45 holds the strap in one direction, and the plate 46 holds it at the other.

On the strap are the arms 48, on which are pivoted the crank arms 49. These arms are mounted on the ends of the revolubly mounted rake bars 92. Now in view of the fact that the eccentric is held on non-revolving parts of the machine and the strap arms are connected by cranks to the rake bars, it is plain that the rotation of the reel will cause the strap to rotate on the eccentric and maintain the rake teeth in a constant angular position with reference to the ground.

The eccentric is in two parts, a segment gear for the reel shaft and an internally geared ring in mesh therewith. This makes the adjustment of the parts easy, the mounting of them facile, and takes strain off of the shaft and the frame by having two opposed members (the lever 39 and the arm 31) holding the eccentric parts against rotation.

The operation of my improved side delivery rake is as follows: The movement for the rake reels is transmitted to the rake shaft 8 through the rotation of the main axle 2 as the carrying wheels fixed on the main axle are moved over the ground. The sliding clutch 24, which is of the ordinary well known kind of ratchet clutch, keyed on the axle 2 to slide thereon, is shifted to engage the teeth on the hub of the large beveled gear 23 which is loosely mounted on the main axle so that the gear 23 will rotate with the rotation of the axle. The large gear 23 meshes with the beveled gear 22 which is keyed on the inner end of the rake shaft 8 so that the rake shaft is rotated with the movement of the machine over the ground, when the sliding clutch 24 is thrown into engagement with the gear 23. The rotation of the rake shaft 8 carries with it the reels 7, which are keyed on the shaft 8, and with these reels the rake bars and rake teeth are rotated. The inner ends of the rake bars 92 carrying the rake teeth are also slowly rotated to maintain the rake teeth 93 in proper angular position to the ground as the reels are rotated, inasmuch as the crank arms 49 on the inner ends of the rake bars 92 are coupled to the arms 48 of the eccentric strap 44, which is mounted as described on the eccentric ring 36. As shown in Fig. 3, the center of the eccentric ring 36 is to the left of the center of the rake shaft 8.

The eccentric 36 is mounted in fixed relation to the rake shaft 8 by reason of the engagement of the internal gear teeth 37 on this eccentric with the teeth of the gear 35 which is mounted loosely on the rake shaft 8. The gear 35 is connected by the arm 31 with the rake frame 5 by the pin and slot connection 32, 33, so that the gear 35 is held in fixed position while the shaft rotates. The eccentric 36 is locked in position by the lever arm 39 which engages the pin on the stud 40 mounted in the frame 5. Inasmuch as the eccentric strap 44 rides on the eccentric 36 and this eccentric strap is connected by arms 48 and the crank arms 49, which are mounted in the outer ends of the reels 7, and as the reel shaft 8 is supported in fixed position by the hanger 15, the centers of the eccentric and of the rake shaft 8 maintain a fixed relation to each other.

When it is desired to change the position of the eccentric, so as to vary the angular position of the rake teeth 93, the lever bar 39 is released from the pin 41 and the eccentric is rocked. The result of this movement is that the center of the eccentric 36 turns around the center of the rake shaft 8. The teeth of the segment gear 35 are held in fixed position inasmuch as the bar 31 is connected to the rake frame 5 and therefore the eccentric merely travels around on these teeth, shifting the centers so as to change the position of the arms 48 to the cranks 49 on the rake bars 92.

Now when it is desired to raise the reels and rake teeth from the ground, the operator releases the latch 19 from the segment 20 (Fig. 2) and rocks the hanger 15, which carries the bearing 16 for the inner end of the rake shaft and rocks on the axle 2 and thus raises up the inner end of the rake shaft, and as the reels, rake bars and rake teeth and eccentric construction are all mounted on the rake shaft, the raking portion of the machine is raised at the inner end. At the opposite or far end of the rake shaft 8, the shaft is mounted in the usual hanger dependent from the framework 5; but inasmuch as the inner end of the rake shaft is thus arranged to be raised and lowered, this bearing for the outer end of the shaft has to be slotted or enlarged so as to allow the rake shaft to be raised and lowered at the inner end.

Having thus described my invention, what I claim as new and desire to secure by Letters Patent, is:—

1. In a side delivery rake, a main axle, a rake reel shaft, a hanger on the main axle, means for loosely holding one end of the rake reel shaft on said hanger so as to permit a tilting therein, and means for adjustably swinging the hanger, to tilt up or down the end of the rake reel shaft.

2. In a side delivery rake, a main axle, a rake reel shaft, a hanger on the main axle, means for horizontally and obliquely holding one end of the rake reel shaft on said hanger, and means for adjustably swinging the hanger to tilt up or down the end of the rake reel shaft, said shaft being loosely held in the hanger so as to tilt therein.

3. In a side delivery rake, a main axle, a rake reel shaft, a hanger on the main axle, a sleeve on the rake reel shaft, a collar on the hanger loosely mounted on the sleeve, means in the hanger to engage the sleeve axially and against revolution, and means for adjustably swinging the hanger to tilt up or down the end of the rake reel shaft.

4. In a side delivery rake, a main axle, a rake reel shaft, a hanger on the main axle, a sleeve on the rake reel shaft, a peripheral rib on the sleeve, a collar on the hanger loosely mounted on the sleeve, means in the hanger to engage the rib on the sleeve axially and against revolution, and means for adjustably swinging the hanger to tilt up or down the end of the rake reel shaft.

5. In a side delivery rake, a main axle having a beveled gear thereon, rake members, a shaft for the rake members having a beveled gear in mesh with the first gear, a hanger revolubly mounted on the main shaft, and means for mounting the rake shaft in the hanger, said hanger and gears being so positioned that the gears will remain in mesh when the hanger is in various positions and said shaft being loosely held in the hanger so as to tilt therein.

HENRY B. HOLTVOIGT.

Attest:
OSCAR F. DAVISSON,
EDITH R. DAVIES.